United States Patent [19]

Tanaka et al.

[11] Patent Number: 5,450,322
[45] Date of Patent: Sep. 12, 1995

[54] SUSPENSION CONTROL SYSTEM FOR AUTOMOTIVE VEHICLE

[75] Inventors: Tadao Tanaka, Okazaki; Takao Morita, Toyota; Akihiko Togashi, Okazaki; Naohiro Kishimoto, Okazaki; Hiroaki Yoshida, Okazaki, all of Japan

[73] Assignee: Mitsubishi Jidosha Kogyo Kabushiki Kaisha, Tokyo, Japan

[21] Appl. No.: 228,189

[22] Filed: Apr. 15, 1994

Related U.S. Application Data

[63] Continuation of Ser. No. 716,774, Jun. 18, 1991, abandoned.

[30] Foreign Application Priority Data

Jun. 19, 1990 [JP] Japan .................... 2-160643

[51] Int. Cl.⁶ ........................................... B60G 23/00
[52] U.S. Cl. ........................ 364/424.05; 280/688; 280/707; 364/424.01
[58] Field of Search ............... 364/424.05, 424.01; 280/688, 707

[56] References Cited

U.S. PATENT DOCUMENTS

| | | | |
|---|---|---|---|
| 4,600,215 | 7/1986 | Kuroki et al. | 280/707 |
| 4,616,848 | 10/1986 | Sugasawa et al. | 280/707 |
| 4,634,142 | 1/1987 | Woods et al. | 280/707 |
| 4,650,212 | 3/1987 | Yoshimura | 280/707 |
| 4,781,465 | 11/1988 | Demachi et al. | 356/371 |

FOREIGN PATENT DOCUMENTS 62-131813  6/1987  Japan .

*Primary Examiner*—Kevin J. Teska
*Assistant Examiner*—Leigh Marie Garbowski

[57] ABSTRACT

A system is for controlling a suspension performance detecting the road surface condition in front of an automotive vehicle. A road surface sensor generates an output corresponding to the size of roughness on a road surface located at a predetermined distance in front of the vehicle. A suspension damping coefficient is changed to a smaller value upon lapse of a delay time. The delay time is calculated on the basis of the output of a speed sensor, the delay time being the time required for the wheel to reach the detected rough roads surface. The changing of the suspension damping coefficient occurs on condition that the output of the road surface sensor falls within a control region defined by a lower threshold value and an upper threshold value. Accordingly, the change of the suspension damping coefficient to a smaller value is inhibited when an extremely rough road surface is detected in front of the vehicle, whereby a bottoming out of the suspension which may occur is prevented when the vehicle runs over the extremely rough road surface. Further, the ride feeling is improved when the vehicle runs over a moderately rough road surface.

16 Claims, 6 Drawing Sheets

SUSPENSION CONTROL SYSTEM FOR AUTOMOTIVE VEHICLE

This application is a continuation of application Ser. No. 07/716,774 filed on Jun. 18, 1991, now abandoned.

BACKGROUND OF THE INVENTION

1. Field of the Invention

This invention relates to a suspension control system for an automotive vehicle, which properly controls a suspension performance by detecting the road surface condition in front of the vehicle.

2. Description of the Related Art

Conventional devices for detecting the condition of a road surface in front of a vehicle include an optical type as disclosed in Unexamined Japanese Patent Publication No. 60-142208 (U.S. Pat. No. 4,781,465; GB 2151872; DE 3447015; FR 2557288) and an ultrasonic type as disclosed in Unexamined Japanese Patent Publication No. 62-131813. These publications suggest that the suspension performance can be properly controlled in accordance with the detected road surface condition in front of the vehicle.

While the former of the above two prior art publications does not give a specific example of suspension control, the latter discloses a technique of controlling the damping coefficient of a shock absorber in accordance with the detected condition of the road surface in front of the vehicle.

In the above control system, the damping coefficient is changed to a smaller value when the forward road surface is detected to be rough, to thereby effectively prevent an impulsive high vibration from being induced by a projection on the road surface or a junction of pavement when wheels run over it.

If, however, the damping coefficient is controlled to be a smaller value even when the forward road surface is extremely rough and thus a particularly high vibration is input to the vehicle, the suspension is likely to undergo a bottoming out. If the suspension undergoes such a bottoming out, a strong and impulsive high vibration is transferred to the vehicle body and the ride feeling is spoiled.

The object of this invention is to provide a suspension control system for an automotive vehicle in which the detection of the road surface condition in front of the vehicle is effective so that the ride feeling is improved when the vehicle travels on a moderately rough road. Further, a bottoming out of the suspension is prevented, which could have occurred when the vehicle ran on an extremely rough road.

SUMMARY OF THE INVENTION

The above object is achieved by an automotive suspension control system of this invention which includes changing means for changing a performance characteristic of the suspension;

a road surface sensor for detecting a rough road surface on a road located at a predetermined distance in front of the automotive vehicle and generating an output corresponding to the detected roughness of the road surface;

a speed sensor for detecting the running speed of the automotive vehicle; and control means for controlling the operation of the changing means in accordance with the outputs of the road surface sensor and the speed sensor, said control means including a control region defined by a lower threshold value and an upper threshold value, calculating means for calculating a point of time when the wheel will reach the rough road surface detected by the road surface sensor, on the basis of the output of the speed sensor, and outputting means for outputting a command signal to the changing means at said point of time to change the performance characteristic of the suspension to a flexible mode if the output of the road surface sensor falls within the control region.

According to this invention, the change of the suspension performance characteristic to a flexible mode is effective when the wheels reach the rough road surface detected by the road surface sensor, on condition that the output of the road surface sensor is between the lower and upper threshold values. Therefore, the suspension performance characteristic is never changed to a flexible mode where the roughness of the road surface is small or is extremely high, whereby frequent changes of the suspension performance characteristic and a bottoming out of the suspension are effectively prevented. The suspension performance characteristic is changed to a flexible mode only when the vehicle runs on a moderately rough road, and accordingly, the ride feeling is improved when the vehicle runs over a projection on the road surface or a junction of pavement.

According to a preferred embodiment of the invention, the control means changes the suspension performance characteristic to a flexible mode when the wheels reach the rough road surface detected by the road surface sensor, on condition that the maximum value of the output of the road surface sensor, detected during a predetermined period after the output of the road surface sensor has reached or exceeded the lower threshold value, is not larger than the upper threshold value. Accordingly, the occurrence of bottoming out of the suspension is predicted on the basis of the size of roughness of the road surface, and thus a proper suspension performance control can be obtained.

Preferably, the invention is applied to an active suspension including a hydraulic actuator whose load bearing capacity is controlled by a control valve, and the changing means comprises a selector valve for variably controlling the constricted openings of the oil passages connecting the hydraulic actuator to the accumulator. This arrangement eliminates such a drawback on the active suspension that the ride feeling is not satisfactorily improved against an impulsive high vibration input at a projection on the road surface or a Junction of pavement (since the response of the control valve is so limited as to cope with a high-frequency impulsive type vibration).

The other features and advantages of this invention will become apparent from the ensuing detailed description. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE EMBODIMENTS

A first embodiment of this invention will be described in detail with reference to the drawings.

Figure 1:
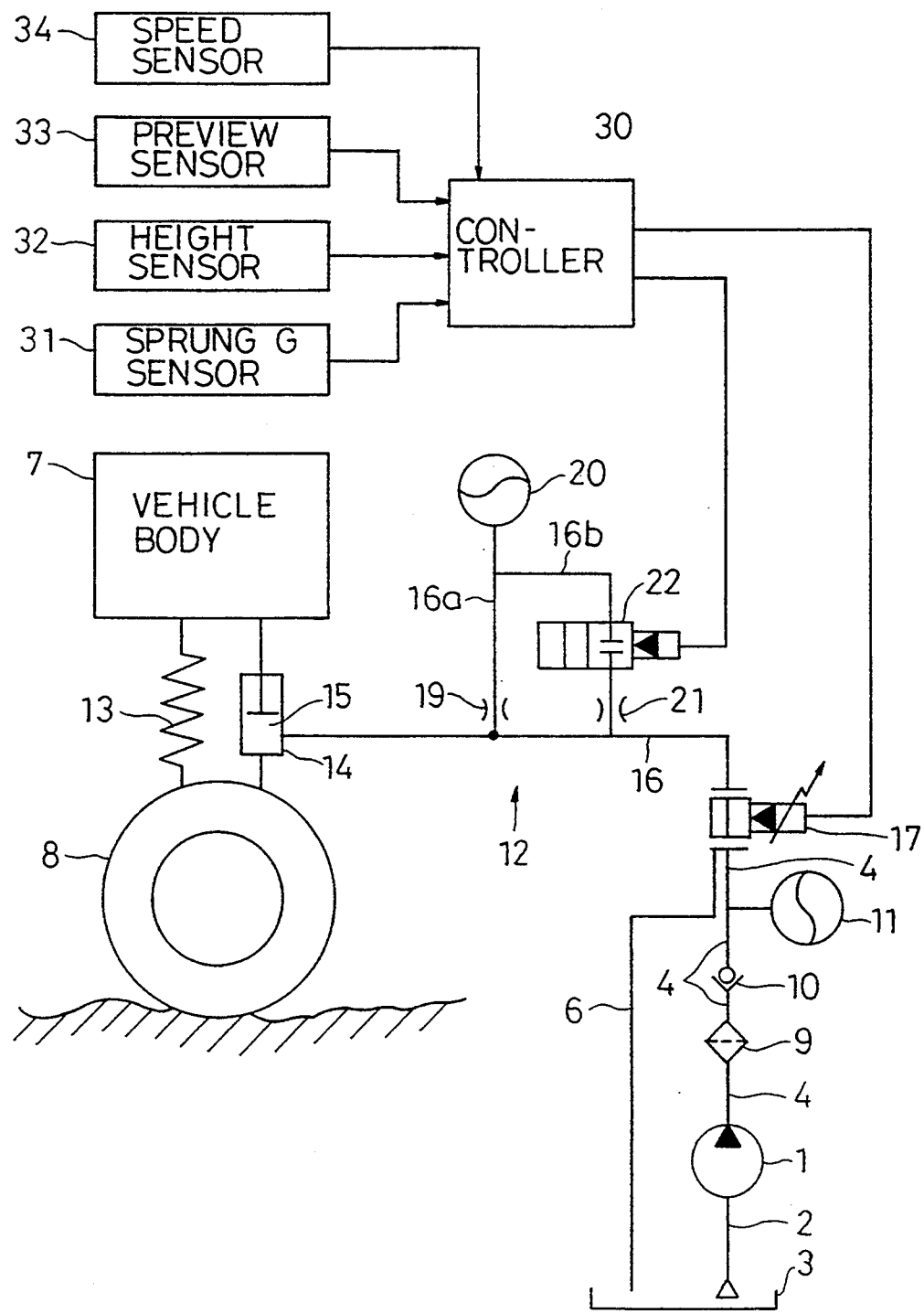
FIG. 1 is a block diagram schematically showing the construction of an automotive active suspension according to the invention.

FIG. 1 shows the construction of an automotive active suspension according to the invention. The figure illustrates only one suspension unit 12 which is in practice provided for each of wheels. The suspension unit 12 comprises a suspension spring 13 and a single acting type hydraulic actuator 14 both arranged between a vehicle body 7 and a wheel 8.

A control valve 17 is connected to an oil passage 16 communicating with an oil pressure chamber 15 of the hydraulic actuator 14, and oil supply and discharge passages 4 and 6 mentioned later. A branch passage 16a is connected at one end to an intermediate portion of the oil passage 16, and the other end of the branch passage is connected to an accumulator 20. The accumulator 20 is filled with a gas, so that the compressibility of the gas provides a spring effect. A primary orifice 19 is provided midway in the branch passage 16a, to restrict the oil flow between the accumulator 20 and the oil pressure chamber 15 of the hydraulic actuator 14 and to thereby produce a vibration damping effect.

A bypass passage 16b bypassing the orifice 19 is provided between the oil passage 16 and the accumulator 20, and a secondary orifice 21 and a selector valve 22 are installed in the bypass passage 16b. The secondary orifice 21 has a larger diameter than that of the first orifice 19, and the selector valve 22 is closed (as illustrated in FIG. 1) when deenergized. When the selector valve 22 is energized and opened, the oil is allowed to pass through the opened selector valve 22 and the orifice 21 and flow between the accumulator 20 and the pressure chamber 15, whereby the vibration damping effect is reduced. Namely, the damping coefficient of the suspension unit 12 is varied in two stages by the operation of the selector valve 22.

The other end of the oil supply passage 4 is connected to the discharge side of an oil pump 1, the suction side of which is connected to a reserve tank 3 via an oil passage 2. When the oil pump 1 is in operation, the oil stored in the reserve tank 3 is delivered to the oil supply passage 4. An oil filter 9, a check valve 10, and an accumulator 11 are arranged in the oil supply passage 4 in sequence from the side of the oil pump 1. The check valve 10 permits the oil to flow only in one direction from the oil pump 1 side to the control valve 17 side, and thus enables the accumulator 11 to store high-pressure oil.

The control valve 17 is of the type whose valve opening is varied in proportion to the value of the current supplied thereto, to control the oil flow from the supply passage 4 to the discharge passage 6 and to thereby control the oil pressure applied to the hydraulic actuator 14. The system is designed such that the load bearing capacity of the hydraulic actuator 14 increases as the electrical current supplied to the control valve 17 is increased. The oil discharged from the control valve 17 to the discharge passage 6 returns to the reserve tank 3.

The control valve 17 and the selector valve 22 are electrically connected to the output of a controller 30, such that the operation thereof is controlled by a driving signal from the controller 30. The input of the controller 30 is connected to various sensors for controlling the suspension unit 12, e.g., a sprung G sensor 31 provided for each of the wheels for detecting the vertical acceleration of the vehicle body, a height sensor 32 provided for each of the wheels for detecting the height of the vehicle body 7 at the respective wheel position, a preview sensor 33 for detecting a projection or the like on a road surface in front of the vehicle and outputting a signal corresponding to the size of the projection or the like, and a speed sensor 34 for detecting the running speed of the vehicle. The aforesaid control valve 17 and the selector valve 22 provided for each wheel, are controlled on the basis of the detection signals of these sensors.

Figure 2:
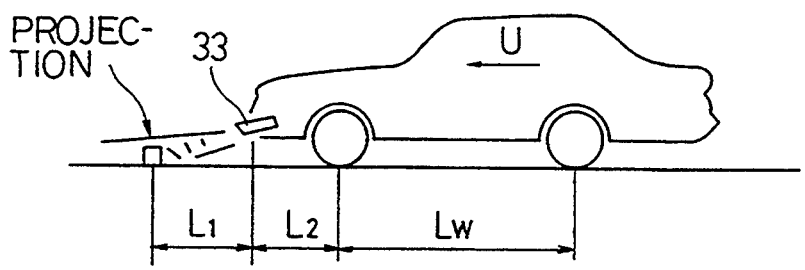
FIG. 2 is a diagram showing the relationship between the position of a projection detected by a preview sensor 33 shown in FIG. 1 and the position of wheels.

The preview sensor 33 comprises, e.g., an ultrasonic sensor, which is mounted to the front portion of the vehicle body such that it points forward and obliquely downward (see FIG. 2).

During normal running of the vehicle, the selector valve 22 is closed, and a slight vibration input to the vehicle body from the road surface is absorbed and damped because the oil pressure chamber 15 of the hydraulic actuator 14 is in communication with the accumulator 20 through the orifice 19. The control valve 17 is supplied with a required quantity of electrical current corresponding to the output signal of the sprung G sensor 31, etc., and the oil pressure applied to the hydraulic actuator 14 is subject to PID control, whereby vertical vibration of the vehicle body is absorbed.

If a vibration-inducing object, such as a projection, is discovered in front of the vehicle body by the preview sensor 33, the controller 30 opens the selector valve 22 and thereby decreases the damping coefficient of the suspension unit 12 to a specific value.

The control of the damping coefficient by means of operating the selector valve 22 will be explained. The controller 30 always monitors the output signal of the preview sensor 33, to detect a projection or the like on the basis of a change in the signal value. The controller 30 outputs a command signal to open the selector valve 22 only when the output signal of the preview sensor 33 falls within a predetermined range suitable for a preview control, as described in detail later.

Figure 3:
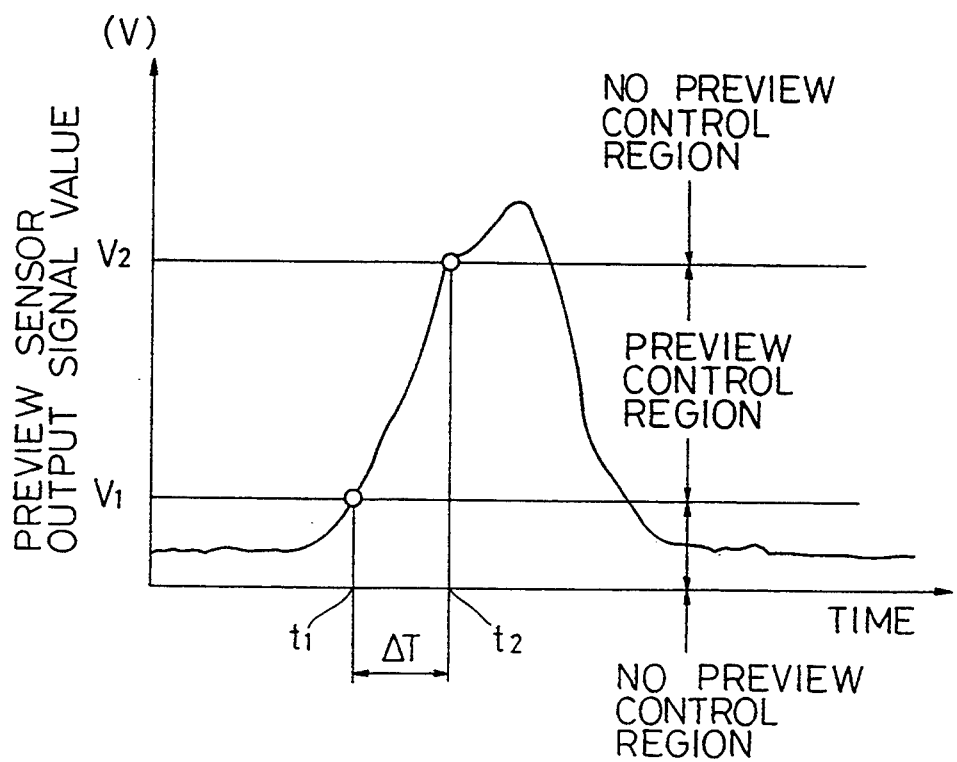
FIG. 3 is a graph showing a typical example of change of the output signal value of the preview sensor 33 with time, illustrating a control region for a selector valve 22 shown in FIG. 1.

Specifically, the output signal of the preview sensor 33 always contains a noise component, as shown in FIG. 3, and therefore, if the preview control is carried out based on all input signals, the damping of the suspension unit 12 is varied more frequently than necessary. To prevent this, a lower threshold value $V_1$ is established to remove the noise component and thus carry out an optimum preview control. If, on the other hand, the damping coefficient of the suspension unit 12 is reduced when the vehicle runs over such a large projection or the like that causes an extremely impulsive force, a so-called bottoming out of the suspension unit 12 occurs, with the ride feeling spoiled. To eliminate this drawback, an upper threshold value $V_2$ is provided such that an optimum preview control is performed in a range wherein no bottoming out of the suspension unit 12 occurs. In this embodiment, the output signal value of the preview sensor 33 is compared to $V_2$ upon lapse of a stand-by time $\Delta T$ (the time period between the measurement of the output signal value equal to $V_1$ and the measurement of the output signal compared to $V_2$) which is set to a shorter time as the vehicle speed increases.

Accordingly, the controller 30 outputs a control signal to open the selector valve 22 only when the output signal value of the preview sensor 33 fails within the preview control region thus set.

Further, a time lag between the detection of a projection or the like and the time when the wheels actually run over the projection is estimated on the basis of the vehicle speed detected by the speed sensor 34. The selector valve 22 is energized and opened just before the wheels run over the projection or the like, so that the damping coefficient of tile suspension unit 12 is changed to a small value when the wheels run over the projection. After the vehicle travels over the projection, the selector valve 22 is again closed.

The details of control (preview control) of the selector valve 22 executed by the controller 30 when the vehicle runs over a projection or the like will be described with reference to FIGS. 4, 6, 7 and 8.

Figure 4:
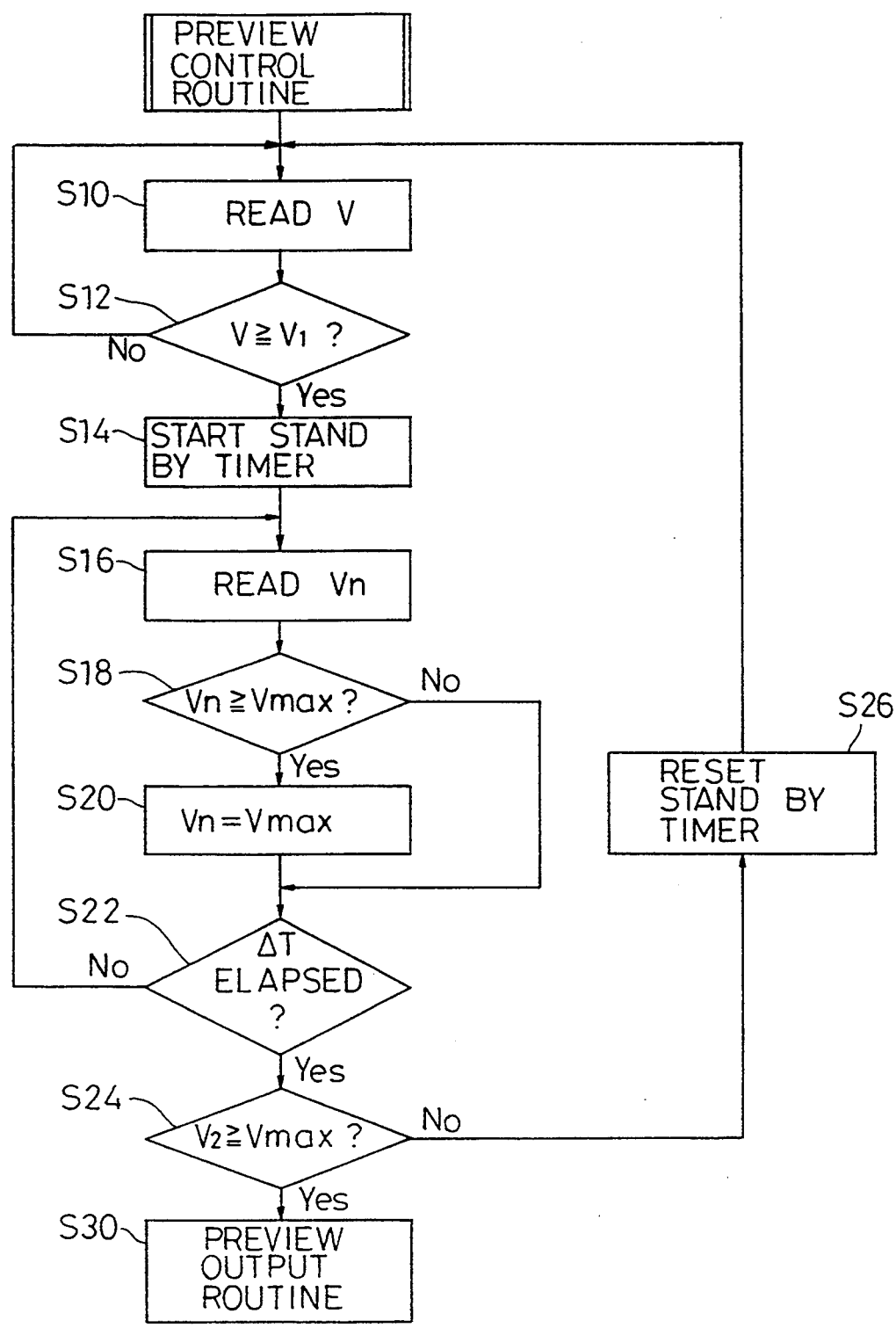
FIG. 4 is a flowchart of a preview control routine executed by a controller 30.

The preview control routine is executed in the following manner (FIG. 4).

The controller 30 always monitors and reads an output signal value V of the preview sensor 33 (Step S10).

It is then estimated whether or not the thus read output signal value of the preview sensor 33 is greater than or equal to the aforementioned lower threshold value $V_1$ (Step S12).

If the result of estimation in Step S12 is No, Steps S10 and S12 are repeated.

If the result of estimation In Step S12 is Yes, a timer for measuring the aforesaid stand-by time $\Delta T$ is started (Step S14).

The controller 30 then reads an output signal value $V_n$ of the preview sensor 33 (Step S16), and estimates whether or not the output signal value $V_n$ is greater than or equal to a maximum signal value Vmax which is detected after the signal value V has reached the threshold value $V_1$ (Step S18).

If the result of estimation in Step S18 is Yes, the current maximum signal value Vmax is replaced with the output signal value $V_n$ and $V_n$ is stored as the new maximum signal value Vmax (Step S20).

When the result of estimation in Step S18 is No or when the updating of the maximum signal value Vmax in Step S20 is completed, it is estimated whether or not the aforementioned stand-by time $\Delta T$ has passed (Step S22).

If the result of estimation in Step S22 is No, Steps S16, S18 and S20 are executed again for updating the maximum signal value Vmax.

If the estimation in Step S22 gives an answer Yes, it is estimated whether or not the maximum signal value Vmax detected during the stand-by time $\Delta T$, after the output signal value V of the preview sensor 33 has reached the lower threshold value $V_1$, is smaller than or equal to the upper threshold value $V_2$ (Step S24).

If the result of estimation in Step S24 is Yes, that is, if the detected projection is not so extremely large and it is estimated that the Suspension unit 12 will not undergo a bottoming out even if the damping coefficient of the suspension unit 12 is reduced when the vehicle runs over the projection, Step S30 is executed to output a control signal to energize and open the selector valve 22.

If the result of estimation in Step S24 is No, that is, if the detected projection is extremely large and it is estimated that a bottoming of the suspension unit 12 will occur if the damping coefficient of the suspension unit 12 is decreased when the vehicle runs over the projection, the timer is reset and Vmax is set to zero (Step S26), without executing the preview output routine in Step S30, the details of which will be discussed later referring to FIG. 7 and the preview control routine is finished. Thereafter, the monitoring and the reading of the output signal value V of the preview sensor 33 is started again (Step S10).

Figure 6:
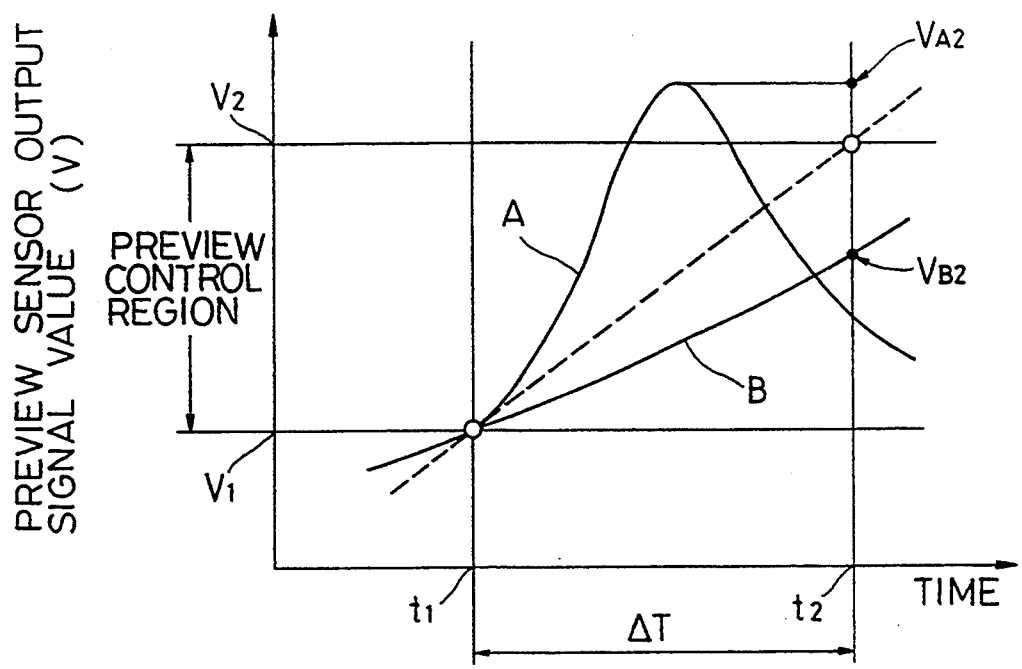
FIG. 6 is a graph showing a typical example of time-based changes of the output signal value of the preview sensor 33, illustrating the preview control routine executed by the controller 30.
Figure 8:
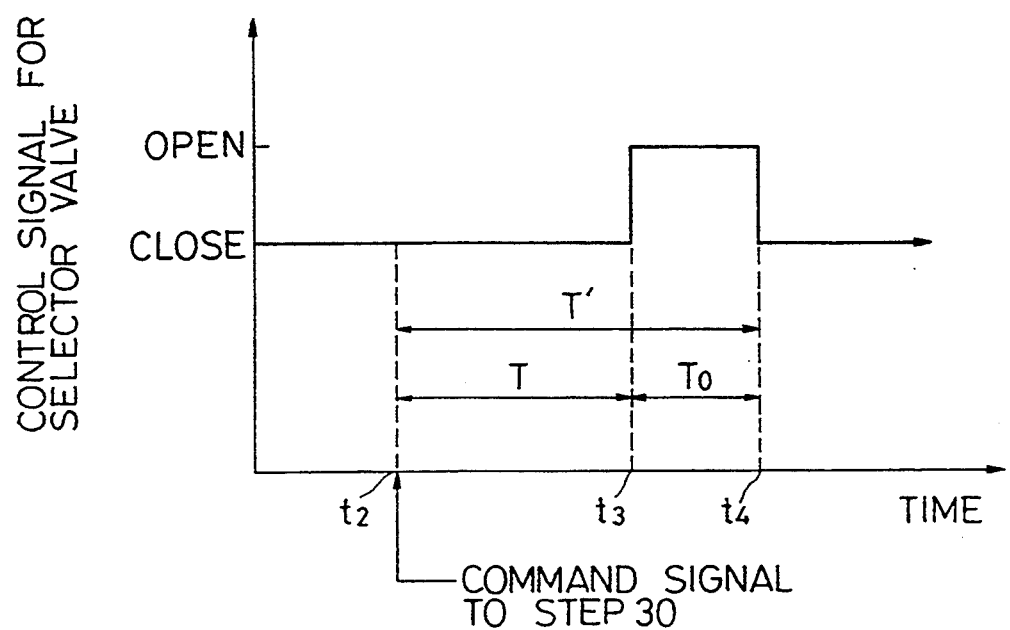
FIG. 8 is a graph showing a time-based change of a control signal to the selector valve 22.

FIG. 6 shows typical examples of signal curves obtained with respect to different projections on the road surface. For the output signal indicated by curve A, its maximum signal value Vmax ($=V_{A2}$) detected during the stand-by time $\Delta T$ is larger than the upper threshold value $V_2$, and therefore, the preview output routine of Step S30 is not executed. In the case of the output signal indicated by curve B, its maximum signal value Vmax ($=V_{B2}$) detected during the stand-by time $\Delta T$ is smaller than the upper threshold value $V_2$, and accordingly, the preview output routine is executed in Step S30.

The stand-by time $\Delta T$ is set in accordance with the vehicle speed, as mentioned above, but may be a fixed value. The output signal value V detected during the lapse of $\Delta T$ is used for the estimation in Step 24, because it can be supposed that, in the case of a projection not having a sharp upward slope, no bottoming out of the suspension unit 12 will occur if the damping coefficient of the unit 12 is reduced, no matter how large its absolute size is.

Now, the details of the preview output routine in Step 30 will be described with reference to FIG. 7.

First, a delay time T is calculated (Step S32). This delay time specifies the time after the command signal is received from the aforementioned control routine (at time t2 in FIGS. 3 and 8) at which the selector valve 22 is opened just before the wheels run over the projection, and is calculated by the following equations:

$$T=(L_1+L_2)/U-\Delta T \quad (1)$$

$$T=(L_1+L_2+L_w)/U-\Delta T \quad (2)$$

Equation (1) is used to obtain the delay time for the front wheels, and equation (2) is used to obtain the delay time for the rear wheels. $L_2$ is the distance between the sensor 33 and the detected projection, $L_2$ is the distance between the sensor 33 and the front wheels, $L_w$ is the distance between the front and rear wheels (i.e., wheelbase), and U is the vehicle speed detected by the speed sensor 34 (see FIG. 2). ΔT represents the aforementioned stand-by time.

The program then goes to Step S34, wherein values T and T' hereafter mentioned are set in a delay timer and a hold timer, respectively, and the timers are started.

The delay timer is used to measure the delay time T set in above Step S32, and is provided for each of the front and rear wheels, respectively. Also, the hold timer is provided for each of the front and rear wheels, respectively, and the timer value T' will be calculated from the following equation (3):

$$T = T + T_o \quad (3)$$

where $T_o$ represents the holding time for which the selector valve 22 is opened, and is set, e.g., to 0.1 sec, and T is the delay time calculated from equation (1) or (2).

Each delay timer comprises an up counter which outputs a command signal when it counts up to the set timer value (at time t3 in FIG. 8), to open the corresponding selector valves 22 on the front or rear wheels (Steps S36 and S38). Accordingly, the secondary orifice 21, in addition to the primary orifice 19, is activated whereby the damping coefficient of the suspension unit 12 is changed to a small value. Thus, when the wheels run over the projection, the impulsive force is appropriately damped without a bottoming out of the suspension unit 12 encouraged.

Figure 5:
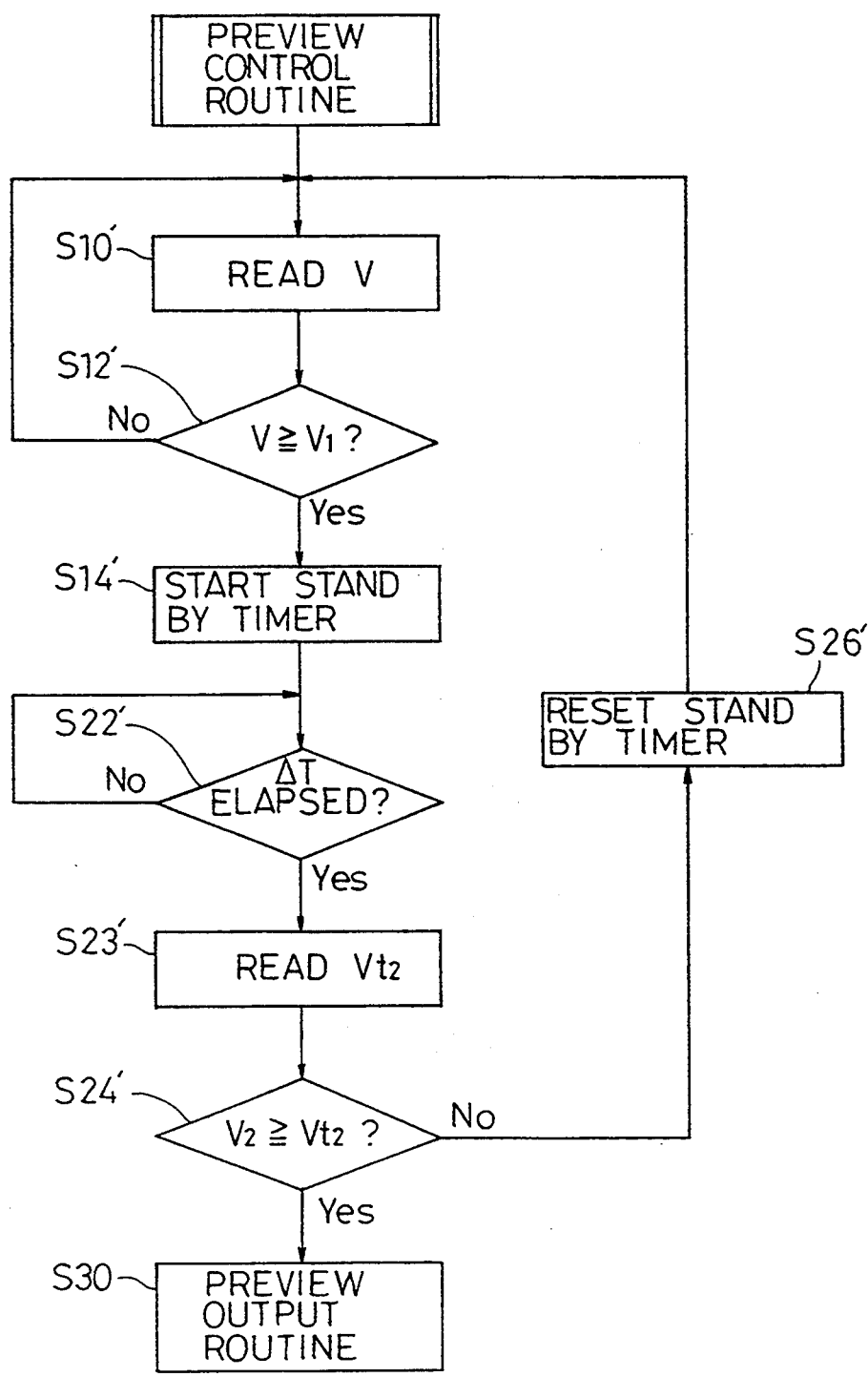
FIG. 5 is a flowchart showing another example of the preview control routine executed by the controller 30.

Also each hold timer comprises an up counter which outputs a command signal when it counts up to the set timer value T'. When the set value is counted up (at time t4 in FIG. 8), the corresponding selector valve 22 on the front or rear wheel is closed (Steps S40 and S42), and the preview output routine is finished. The damping coefficient of the suspension unit 12 is thereafter maintained at a high value until the controller 30 estimates by the preview control routine that the preview output routine should be executed. FIG. 5 illustrates a simplified procedure for the aforementioned preview control routine (FIG. 4) according to a second embodiment.

Like the first embodiment, the second embodiment is carried out using the construction of the automotive active suspension shown in FIG. 1, the preview sensor 33 of FIG. 2, and the control region for the selector valve 22 shown in FIG. 3, and accordingly, descriptions thereof are omitted here.

The controller 30 monitors and reads the output signal value V of the preview sensor 33 (Step S10').

It is then estimated whether or not the thus read output signal value V of the preview sensor 33 is greater than or equal to the aforesaid lower threshold value $V_1$ (Step S12').

If the result of estimation in Step S12' is No, Steps S10' and S12' are repeatedly executed.

If the result of estimation in Step S12' is Yes, the timer for measuring the stand-by time ΔT is started (Step S14').

Then, the stand-by time ΔT is counted up (Step S22'), an output signal value V of the preview sensor 33 is read and stored as $Vt_2$ (Step S23'). It is then estimated whether or not the output signal value $Vt_2$ is smaller than or equal to the aforementioned upper threshold value $V_2$ (Step S24').

If the result of estimation in Step S24' is Yes, that is, if it is estimated that the suspension unit 12 will not undergo a bottoming out even if the damping coefficient of the unit 12 is reduced when the vehicle runs over the detected projection or the like, a command signal is output in Step S30 to energize and open the selector valve 22.

If the result of estimation in Step S24' is No, that is, if it is estimated that a bottoming of the suspension unit 12 will occur if the damping coefficient of the unit 12 is reduced when the vehicle runs over the detected projection or the like, the timer is reset (Step S26'), without executing the preview output routine in Step S30, and the preview control routine is finished.

Figure 7:
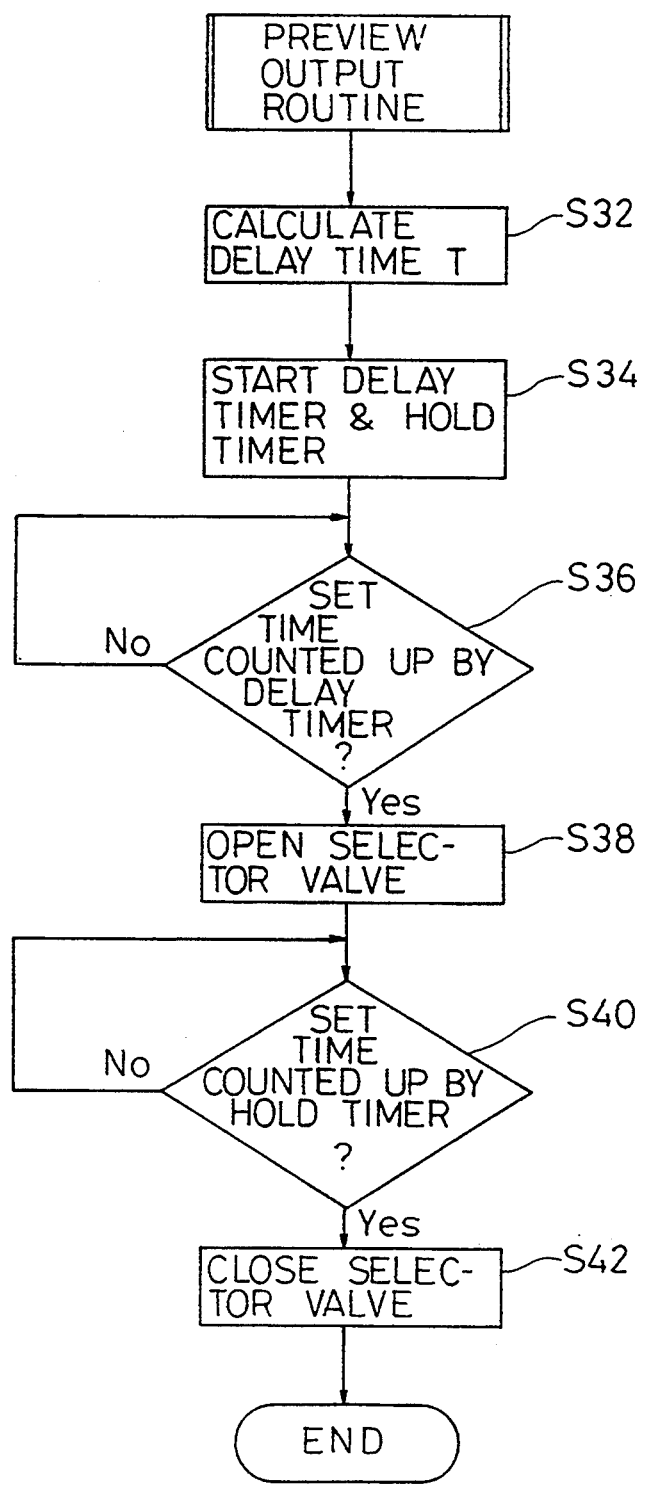
FIG. 7 is a flowchart showing the procedure of a preview output routine control executed by the controller 30.

When the command signal is output, a preview output routine similar to that of the first embodiment shown in FIG. 7 is executed.

In the foregoing embodiments, the invention is applied to a hydraulic active suspension, but it can also be applied to a suspension control system including a damping coefficient-switchable type shock absorber or to a suspension control system including an air spring whose spring constant is variable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension control system for an automotive vehicle having a vehicle body, at least one wheel and a suspension through which the vehicle body carries the at least one wheel, the system comprising:
    changing means for changing a performance characteristic of the suspension;
    a road surface sensor for detecting roughness of a road surface on a road located at a predetermined distance in front of the automotive vehicle and generating an output corresponding to the detected roughness of the road surface;
    a speed sensor for detecting the running speed of the automotive vehicle; and
    control means for controlling the operation of the changing means in accordance with the outputs of the road surface sensor and the speed sensor, said control means including
        calculating means for calculating a point of time at which the at least one wheel will reach the roughness of the road surface detected by the road surface sensor, on the basis of the output of the speed sensor,
        means for defining a control region of a predetermined minimum roughness and a predetermined maximum roughness, the predetermined maximum roughness being established to prevent a bottoming out of the suspension,
        inhibiting means for inhibiting change of the performance characteristic of the suspension to a flexible mode if the output of the road surface sensor is determined to be outside the defined control region, and
        outputting means for outputting a command signal to the changing means at said calculated point of time to change the performance characteristic of the suspension to a flexible mode if the output of the road surface sensor is determined to be within the defined control region.

2. The suspension control system according to claim 1, wherein said control means further includes means for estimating whether or not the output of the road surface sensor is within the control region, if a maximum value of the output of the road surface sensor, detected during a predetermined time period beginning after the output of the road surface sensor has been determined to be at least equal to the predetermined minimum roughness, is less than the predetermined maximum roughness.

3. The suspension control system according to claim 2, wherein said control means further includes means for varying the predetermined time period in accordance with the output of the speed sensor such that the predetermined time period is set relatively shorter as the vehicle speed relatively increases.

4. The suspension control system according to claim 1, wherein the calculating means calculates the point of time at which the at least one wheel will reach the detected roughness of the road surface in response to the output of the road surface sensor being at least equal to the predetermined minimum roughness.

5. The suspension control system according to claim 1, wherein the outputting means includes means for delivering a command signal to the changing means to maintain the performance characteristic of the suspension in a flexible mode for a predetermined time after said point of time.

6. The suspension control system according to claim 1, wherein the suspension includes an active suspension including a hydraulic actuator and a control valve for varying a load bearing capacity of the active suspension, and the changing means includes a hydraulic accumulator, a passage for connecting the hydraulic accumulator to the hydraulic actuator and orifice means for variably constricting an opening of the passage.

7. The suspension control system according to claim 6, wherein the passage includes primary and secondary passages which connect the hydraulic actuator to the hydraulic accumulator in parallel to each other, and the orifice means includes primary and secondary orifices inserted in the primary and secondary passages, respectively, and a selector valve inserted in the portion of the secondary passage between the hydraulic accumulator and the secondary orifice, the selector valve selectively opening or closing the secondary passage.

8. The suspension control system according to claim 1, wherein said control means further includes means for estimating whether or not the output of the road surface sensor is within the control region, if an output of the road surface sensor, detected upon lapse of a predetermined time period beginning after the output of the road surface sensor has at least reached the predetermined minimum roughness, is less than the the predetermined maximum roughness.

9. The suspension control system according to claim 1, wherein said control means includes a first means for estimating whether or not the output of the road surface sensor falls within the control region, and a second means for calculating a delay time required for the wheel to reach the detected roughness of the road surface, on the basis of the output of the speed sensor, when it is estimated by the first means that the output generated from the road surface sensor falls within the control region, and a third means for outputting the command signal to the changing means, upon lapse of the delay time, to change the performance characteristic of the suspension to a flexible mode.

10. The system of claim 1, wherein the predetermined minimum roughness is set so that noise of the detected roughness of the road surface is removed.

11. A method for controlling suspension of an automotive vehicle, comprising the steps of:
(a) detecting roughness of a road surface on a road located at a predetermined distance in front of the automotive vehicle;
(b) determining if the detected roughness is greater than or equal to a predetermined minimum roughness;
(c) determining if the detected roughness is less than a predetermined maximum roughness, the predetermined maximum roughness being established to prevent a bottoming out of the suspension;
(d) inhibiting change of a performance characteristic of the suspension to a flexible mode if the detected roughness is determined to be less than the predetermined minimum roughness in step (b) or if the detected roughness is determined to be greater than or equal to the predetermined maximum roughness in step (c); and
(e) changing a performance characteristic of the suspension if the detected roughness is determined to be greater than or equal to the predetermined minimum roughness in step (b) and less than the predetermined maximum roughness in step (c).

12. The method of claim 11, further comprising the steps of:
(f) detecting the running speed of the automotive vehicle;
(g) calculating a time at which the vehicle will reach the detected roughness of step (a) based upon the detected running speed of step (f); and
(h) changing the performance characteristic of step (e) at the calculated time of step (g).

13. The method of claim 11, wherein the predetermined minimum roughness is set so that noise of the detected roughness is removed.

14. A method of inhibiting change of a performance characteristic of a suspension to a flexible mode in an automotive vehicle, comprising the steps of:
(a) detecting roughness of a road surface;
(b) determining if the detected roughness is less than a predetermined minimum roughness;
(c) determining if the detected roughness is greater than or equal to a predetermined maximum roughness;
(d) inhibiting change of a performance characteristic of the suspension to a flexible mode if the detected roughness is determined to be less than the predetermined minimum roughness in step (b) or greater than or equal to the predetermined maximum roughness in step (c).

15. The method of claim 14, further comprising the step of:
(e) controlling the suspension by changing a performance characteristic to a flexible mode if the detected roughness is not determined to be less than a predetermined minimum roughness in step (b) and is not determined to be greater than or equal to the predetermined maximum roughness in step (c).

16. The method of claim 15, further comprising the steps of:
(f) detecting a running speed of the vehicle;
(g) calculating a point of time at which at least one wheel of the vehicle will reach the detected roughness, wherein the suspension is controlled in step (e) at the calculated point of time of step (g).

* * * * *